(12) United States Patent
Jones

(10) Patent No.: US 9,113,063 B2
(45) Date of Patent: Aug. 18, 2015

(54) MOVING CAMERA WITH OFF-AXIS SLIP RING ASSEMBLY

(71) Applicant: Robert Bosch GmbH, Stuttgart (DE)

(72) Inventor: Theodore L. Jones, Akron, PA (US)

(73) Assignee: Robert Bosch GmbH, Stuttgart (DE)

( * ) Notice: Subject to any disclaimer, the term of this patent is extended or adjusted under 35 U.S.C. 154(b) by 64 days.

(21) Appl. No.: 14/032,802

(22) Filed: Sep. 20, 2013

(65) Prior Publication Data

US 2015/0085182 A1     Mar. 26, 2015

(51) Int. Cl.
*G03B 17/00*     (2006.01)
*H04N 5/225*     (2006.01)
*G02B 7/02*      (2006.01)

(52) U.S. Cl.
CPC ............. *H04N 5/2254* (2013.01); *G02B 7/022* (2013.01); *G02B 7/023* (2013.01); *H04N 5/2252* (2013.01)

(58) Field of Classification Search
USPC ............................ 396/428, 427; 348/143, 373
See application file for complete search history.

(56) References Cited

U.S. PATENT DOCUMENTS

| 4,943,137 A | 7/1990 | Speer |
| 6,246,810 B1 | 6/2001 | Harris et al. |
| 7,545,073 B2 | 6/2009 | Lewis et al. |
| 7,792,400 B1 | 9/2010 | Zhang et al. |
| 8,350,653 B2 | 1/2013 | Rhodes et al. |
| 2012/0007442 A1 | 1/2012 | Rhodes et al. |
| 2012/0206604 A1* | 8/2012 | Jones .......................... 348/159 |
| 2012/0207430 A1 | 8/2012 | Zhang et al. |

FOREIGN PATENT DOCUMENTS

| CN | 201674583 | 12/2010 |
| CN | 102238321 | 11/2011 |
| EP | 2192444 | 6/2010 |
| JP | 2001037007 | 2/2001 |

OTHER PUBLICATIONS

Extended European Search Report for Application No. 14181213.1 dated May 11, 2015 (6 pages).

* cited by examiner

*Primary Examiner* — Rochelle-Ann J Blackman
(74) *Attorney, Agent, or Firm* — Michael Best & Friedrich LLP

(57) ABSTRACT

A camera unit includes a housing, a pan stage disposed inside the housing and rotatable relative to the housing about a pan axis, a camera lens assembly coupled to the pan stage, and a slip ring assembly having a slip ring stator fixedly coupled to the pan stage at a location offset from the pan axis.

20 Claims, 5 Drawing Sheets

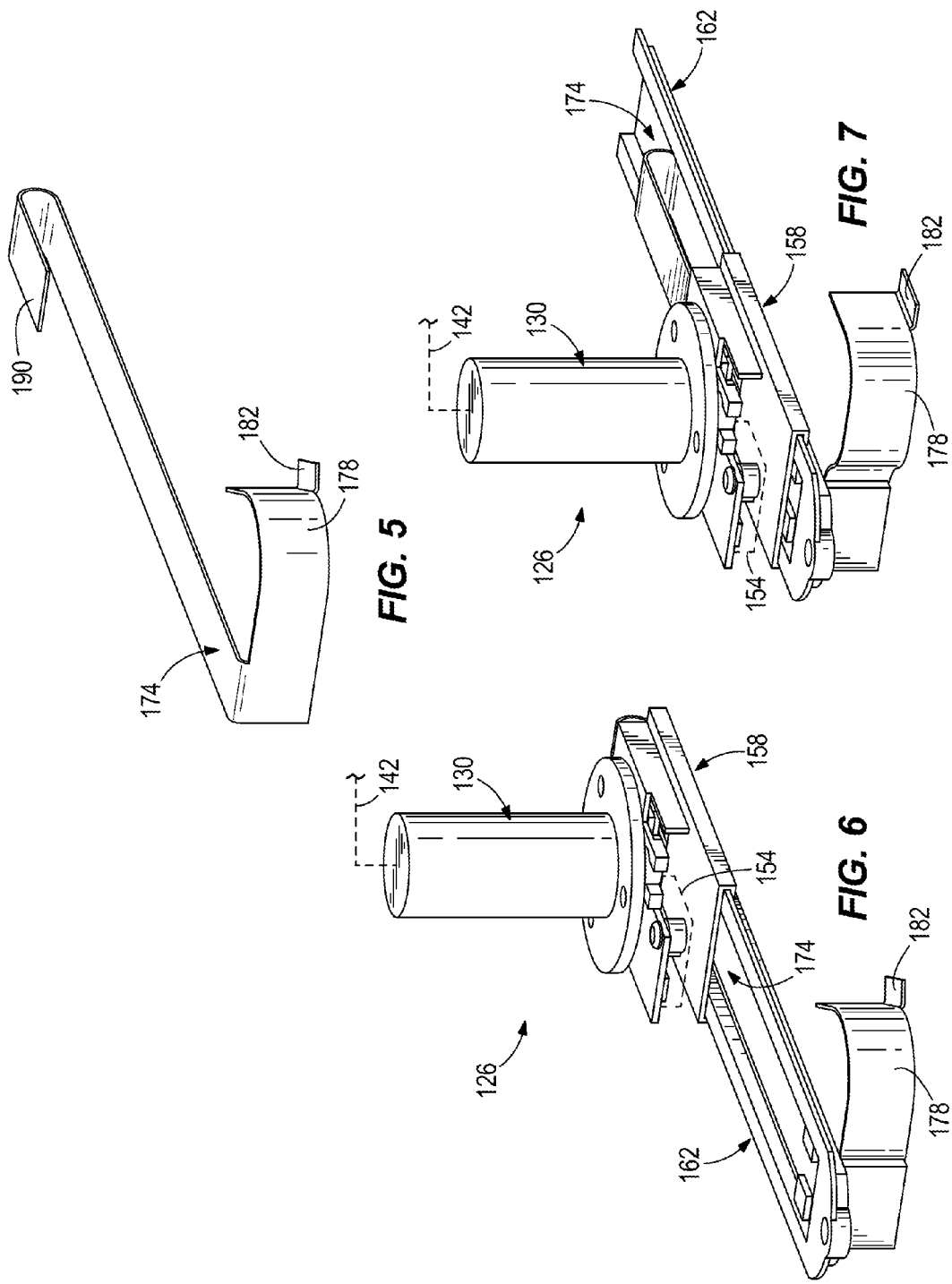

MOVING CAMERA WITH OFF-AXIS SLIP RING ASSEMBLY

BACKGROUND

The present invention relates to camera units, and specifically to moving camera units.

Moving camera units, such as pan-tilt-zoom cameras, are commonly used in surveillance settings. The camera units include a housing having a transparent window, as well as a camera lens assembly disposed inside the housing that, moves on both a tilt axis and a pan axis to obtain broad ranges of surveillance coverage through the transparent window. The camera units are typically mounted to the rooftops of buildings, at intersections, on residential homes, as well as other locations where surveillance and monitoring is desired.

The moving camera units utilize a slip ring assembly to transfer electricity from a stationary circuit board inside the camera unit to the lens assembly within the camera unit. The slip ring assembly is disposed directly below the camera lens assembly, such that both a stator and rotor of the slip ring assembly are aligned coaxially with the pan axis.

SUMMARY

In accordance with one construction, a camera unit includes a housing, a pan stage disposed inside the housing and rotatable relative to the housing about a pan axis, a camera lens assembly coupled to the pan stage, and a slip ring assembly having a slip ring stator fixedly coupled to the pan stage at a location offset from the pan axis.

In accordance with another construction, a moving camera unit includes a housing having a viewing window, and a pan stage disposed inside the housing and rotatable relative to the housing about a pan axis. The pan axis extends through the viewing window. The camera unit also includes a camera lens assembly coupled to the pan stage and disposed between the pan stage and the viewing window, and a slip ring assembly coupled to the camera lens assembly. The slip ring assembly includes a slip ring stator fixedly coupled to the pan stage at a location offset from the pan axis, a slip ring rotor coupled to the slip ring stator, a carrier element coupled to the slip ring rotor, and a track element coupled to the carrier element and pivotally coupled to the housing, the carrier element slidably disposed along the track element.

Other aspects of the invention will become apparent by consideration of the detailed description and accompanying drawings.

BRIEF DESCRIPTION OF THE DRAWINGS

FIG. 5 is a perspective view of a flexible electrical element used in the slip ring assembly of FIG. 3.

FIG. 6 is a perspective view of the slip ring assembly of FIG. 3 in a first position.

FIG. 7 is a perspective view of the slip ring assembly of FIG. 3 in a second position.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
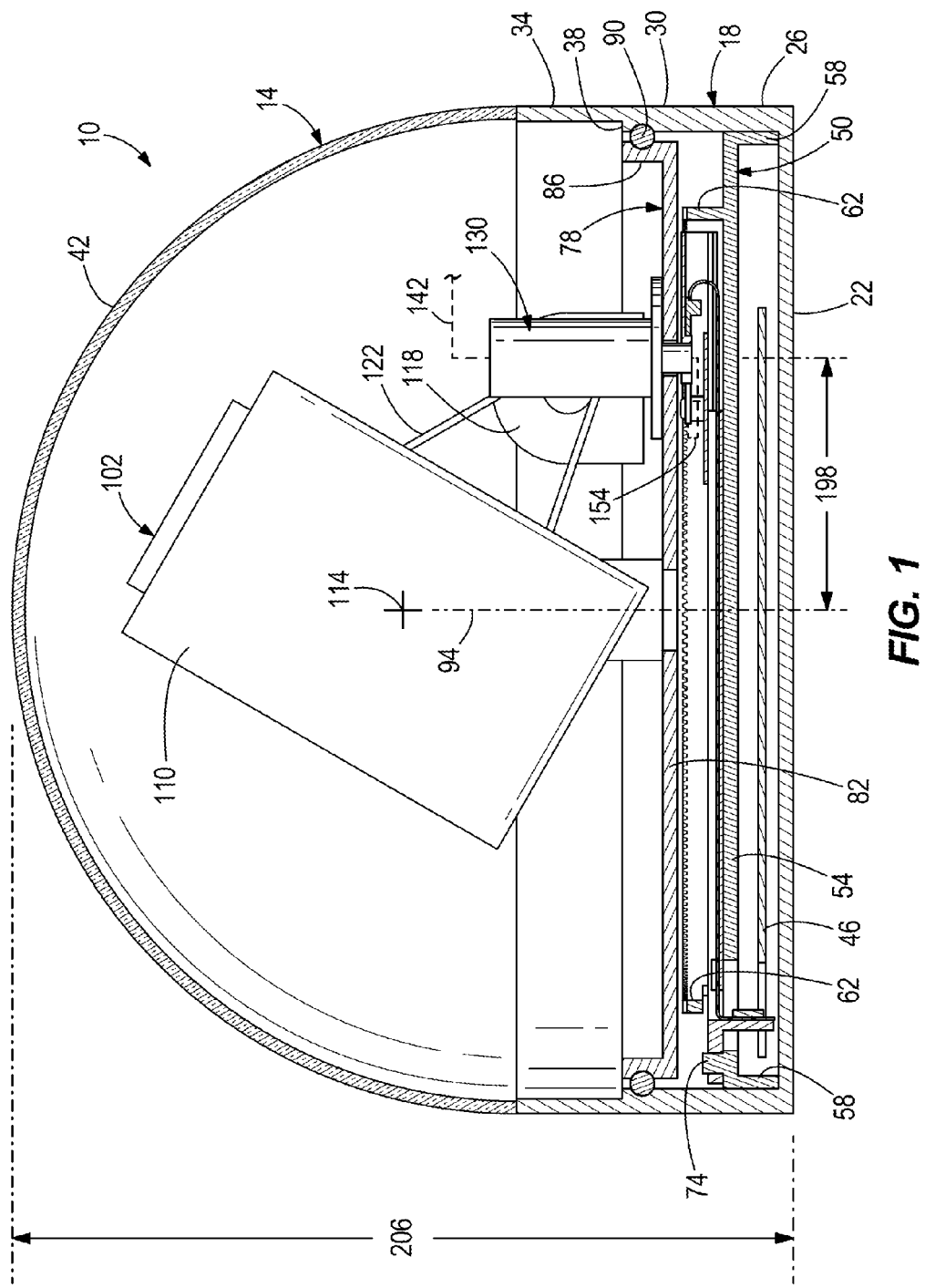
FIG. 1 is a cross-sectional view of a camera unit according to one construction of the invention, including a slip ring assembly.
Figure 2:
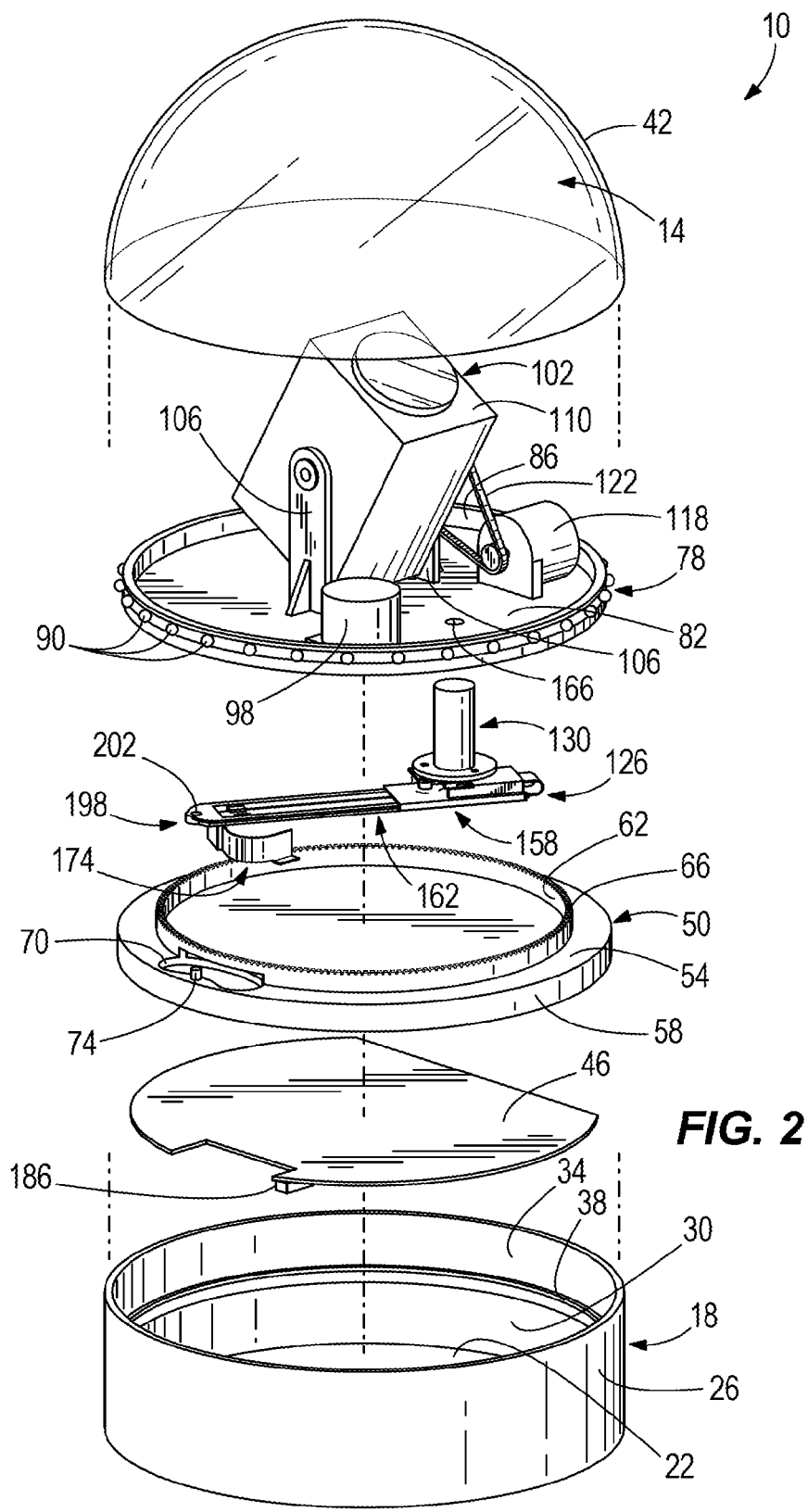
FIG. 2 is an exploded view of the camera unit of FIG. 1.

FIGS. 1 and 2 illustrate a camera unit 10. The camera unit 10 includes a housing 14 having a base portion 18 made of plastic or other suitable material. The base portion 18 is a stationary enclosure for housing one or more internal components of the camera unit 10. The base portion 18 includes a bottom wall 22 and an enclosure wall 26 extending substantially perpendicular to the bottom wall 22. The enclosure wall 26 includes a thicker, lower region 30 disposed adjacent the bottom wall 22, and a thinner, upper region 34 spaced away from the bottom wall 22. The intersection of the regions 30 and 34 forms a ledge 38.

The housing 14 further includes a window portion 42 coupled to the base portion 18. The illustrated window portion 42 is at least partially transparent, and is in the shape of a hemispherical dome. The window portion 42 is made of glass, plastic, or other suitable material.

With continued reference to FIGS. 1 and 2, the camera unit 10 includes a stationary circuit board 46 disposed within the base portion 18. The circuit board 46 is disposed adjacent (e.g., directly mounted to) the bottom wall 22.

The camera unit 10 also includes a partition element 50 disposed within the base portion 18. The partition element 50 includes a generally flat base surface 54, a flange 58 extending downwardly from the base surface 54 at a radially outer edge of the base surface 54, and a flange 62 extending upwardly from the base surface 54 at a position radially inward of the flange 58. With reference to FIG. 2, the flange 62 includes a plurality of gear teeth 66. The partition element 50 also includes an aperture 70 disposed along both a portion of the base surface 54 and the flange 62, and a pivot element 74 disposed adjacent the aperture 70. The pivot element 74 is a small cylindrical protrusion extending from the base surface 54. In other constructions the pivot element 74 is a low friction bearing or other suitable structure.

As illustrated in FIG. 1, the flange 58 rests upon and contacts the bottom wall 22, such that the partition element 50 substantially covers the circuit board 46, and such that the circuit board 46 is disposed between the partition element 50 and the bottom wall 22. The flange 58 is disposed adjacent to the enclosure wall 26.

With continued reference to FIGS. 1 and 2, the camera unit 10 also includes a circular pan stage 78 having a base surface 82 and a flange 86 extending upwardly from the base surface 82 at a radially outer edge of the base surface 82. The flange 86 is sized and configured to be positioned adjacent the lower portion 30 and the internal ledge 38, with a plurality of ball bearings 90 disposed between the flange 86 and the lower portion 30. As illustrated in FIG. 1, the ball bearings 90 allow the pan stage 78 to rotate about a pan axis 94 that extends generally vertically from a center of the pan stage 78 up through the window portion 42. The ball bearings 90 are contained and held in place by the flange 86 and the lower portion 30 with the aid of raceways in the flange 86 and the lower portion 30.

With reference to FIG. 2, the camera unit 10 also includes a pan motor 98 coupled to (e.g., fixedly coupled to) the pan stage 78. The pan motor 98 includes a gear, belt, or other drive mechanism that engages the gear teeth 66 on the flange 62 to drive rotation of the pan stage 78 about the pan axis 94.

With continued reference to FIGS. 1 and 2, the camera unit 10 includes a camera lens assembly 102 coupled to the pan stage 78 and disposed between the pan stage 78 and the window portion 42. As illustrated in FIG. 2, the camera lens assembly 102 includes camera supports 106 coupled to (e.g., fixedly coupled to) the pan stage 78. The camera supports 106 pivotally receive and are coupled to opposite sides of a camera 110. The camera supports 106 allow the camera 110 to tilt about a tilt axis 114 (as illustrated in FIG. 1) that extends perpendicular to the pan axis 94. The camera lens assembly 102 also includes a tilt motor 118 coupled to (e.g., fixedly coupled to) the pan stage 78, and a drive element 122 that couples the tilt motor 118 to the camera 110. The tilt motor 118 and drive element 122 drive rotation of the camera 110 about the tilt axis 114.

Through use of the pan motor 98 and the tilt motor 118, the camera 110 is rotatable about both the pan axis 94 and the tilt axis 114, providing the camera 110 with a wide range of viewing angles through the window portion 42.

With reference to FIGS. 1-10, the camera unit 10 also includes a slip ring assembly 126. The slip ring assembly 126 provides an electrical connection between the circuit board 46 and one or more of the pan motor 98, the tilt motor 118, and the camera 110.

Figure 3:
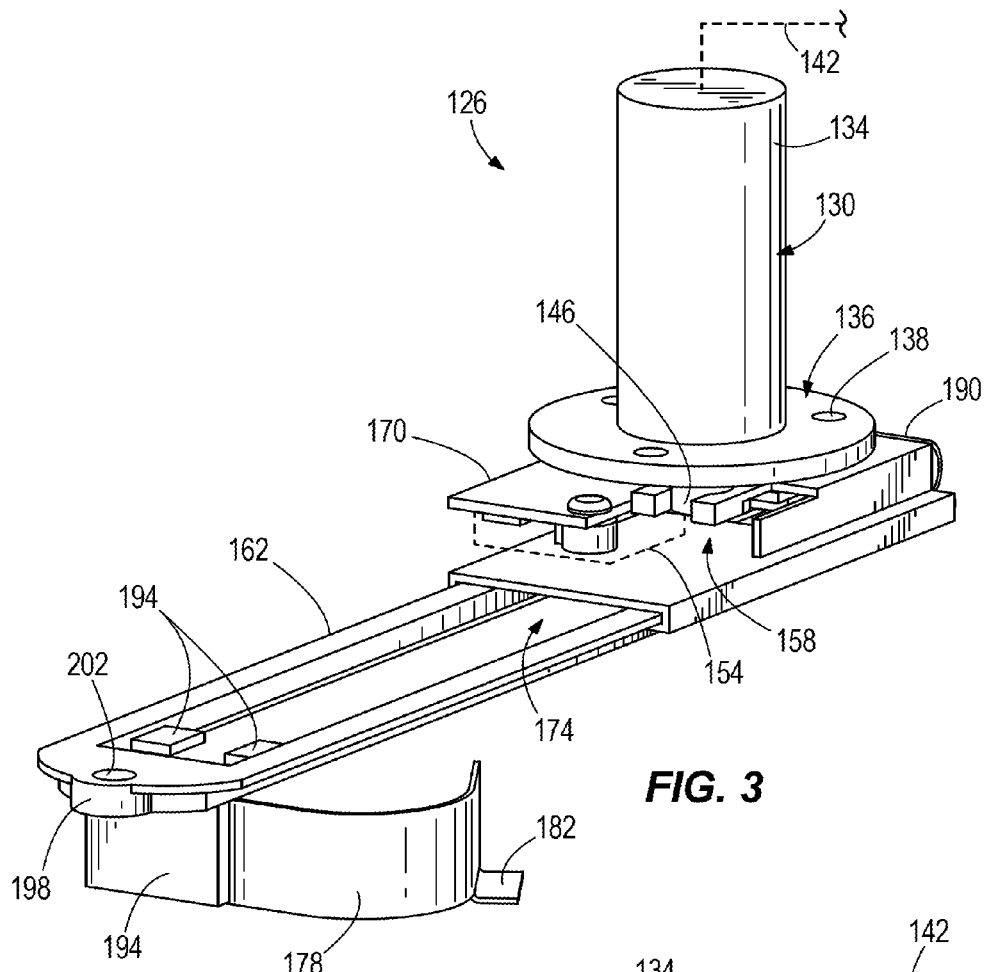
FIG. 3 is a perspective view of the slip ring assembly of FIG. 1.
Figure 4:
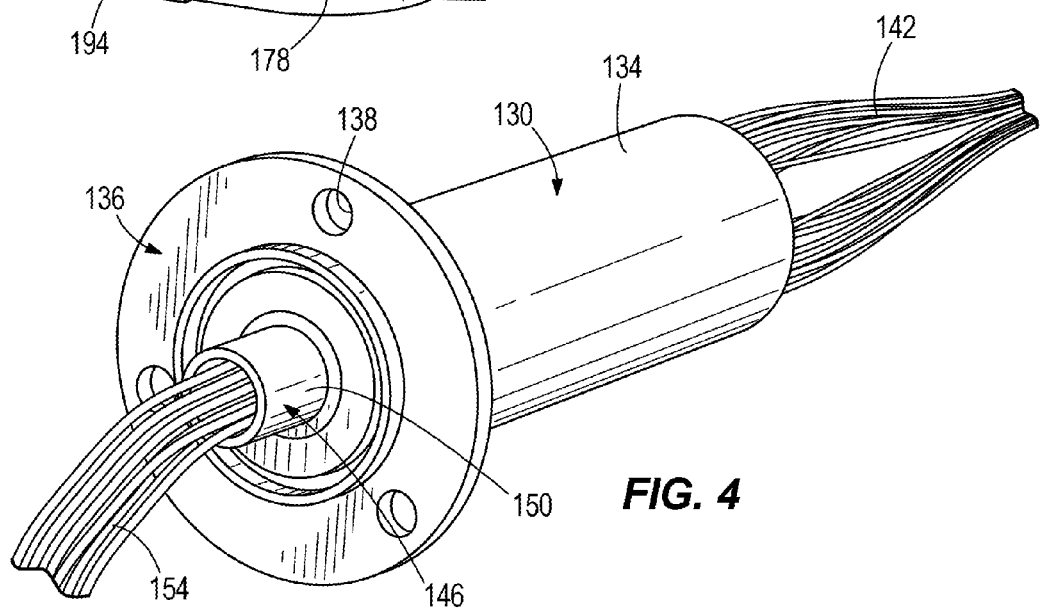
FIG. 4 is a perspective view of a slip ring stator and slip ring rotor used in the slip ring assembly of FIG. 3.
Figure 8:
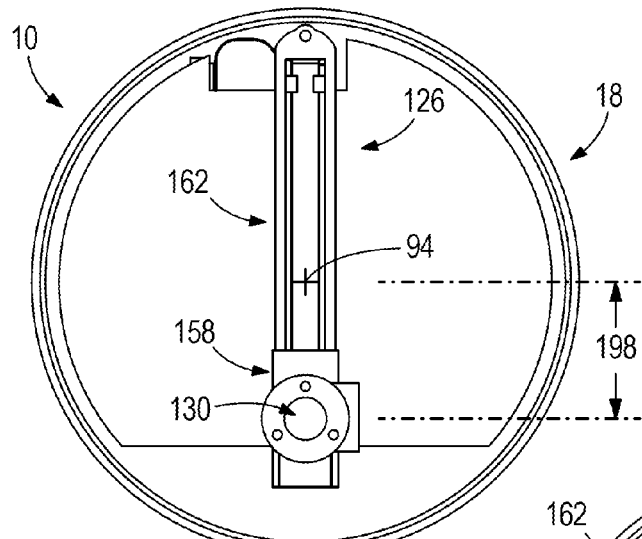
FIGS. 8-10 are top plan views of a portion of the camera unit, illustrating the slip ring assembly moving through a plurality of positions within the camera unit.
Figure 9:
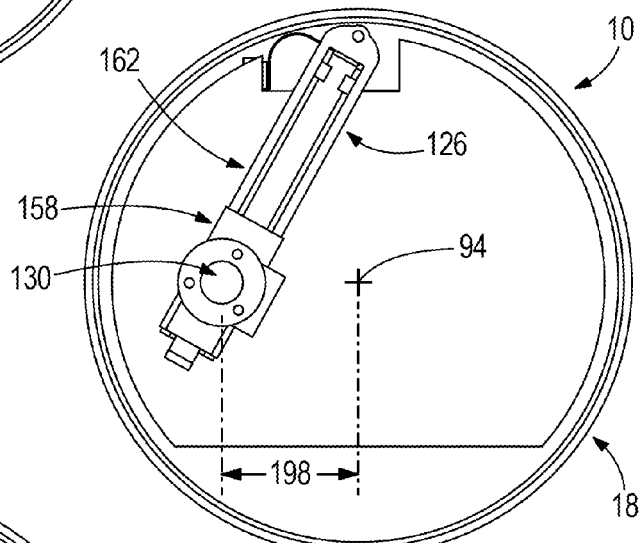
Figure 10:
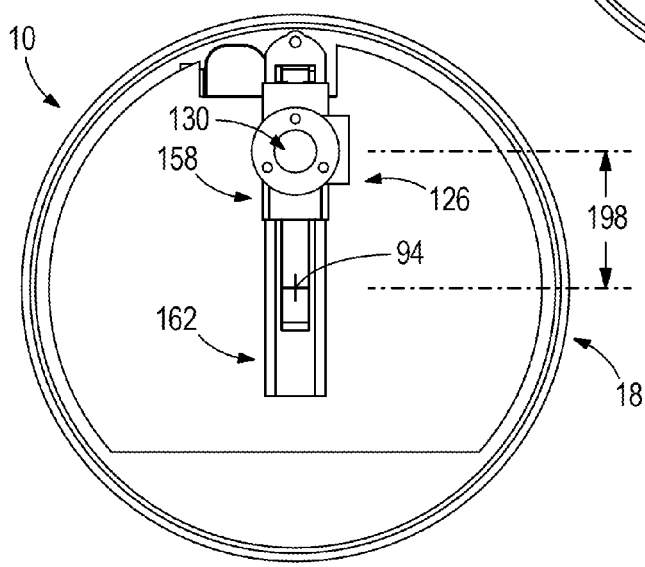

With reference to FIGS. 3 and 4, the slip ring assembly 126 includes a stator 130. The stator 130 is sized and configured to be coupled to (e.g., fixedly coupled to) the pan stage 78. The stator 130 has a cylindrical body 134, a flange 136, and apertures 138 disposed in the flange 136 for inserting fasteners to fasten the stator 130 to the pan stage 78. The stator 130 also includes electrical wiring 142 that extends from a top of the body 134 and is configured to connect with one or more of the pan motor 98, the tilt motor 118, and the camera 110.

With continued reference to FIGS. 3 and 4, the slip ring assembly 126 also includes a rotor 146 disposed at least partially within a cavity formed in a bottom of the stator 130. The rotor 146 is coupled to the stator 130 with bearings inside the cavity (not shown). As illustrated in FIG. 4, the rotor 146 has a cylindrical body 150, and is rotatable within the stator 130. The rotor 146 includes rings (not shown), and electrical wiring 154 that extends from a bottom of the body 150. While not illustrated, the slip ring assembly 126 further includes a brush or brushes disposed in the stator 130 that are in electrical contact with the rings on the rotor 146 and facilitate transfer of electricity between the rotating rotor 146 and the stator 130.

With reference to FIGS. 2 and 3, the slip ring assembly 126 further includes a slip ring carrier element 158 and a slip ring track 162 that are sized and configured to be at least partially disposed between the pan stage 78 and the partition element 50. As illustrated in FIG. 2, the rotor 146 extends through an aperture 166 on the pan stage 78 and is coupled to (e.g., fixedly coupled to) the carrier element 158. The carrier element 158 is coupled to the track 162, and is slidably disposed in a linear direction along the track 162.

For purposes of discussion herein, the illustrated stator element (i.e., stator 130) is an element that is fixed to the pan stage 78, and the rotor element (i.e., rotor 146) is an element that is fixed to the carrier element 158. Thus, while both the stator and rotor elements are fixed relative to another component in the camera unit 10, they are also rotatable relative to one another (i.e., the rotor 146 is rotatable relative to the stator 130, and vice versa). Additionally, while the rotor 146 is illustrated as being disposed inside the stator 130, in other constructions the stator 130 is disposed inside the rotor 146.

With continued reference to FIG. 3, the slip ring assembly 126 also includes a circuit board 170. The circuit board 170 is coupled to (e.g., fixedly coupled to) the carrier element 158, and is also coupled to the rotor 146 with the electrical wiring 154.

With reference to FIGS. 2, 3 and 5, the slip ring assembly 126 also includes an electrical element 174 that transmits electricity between the circuit board 46 and the circuit board 170. The electrical element 174 is a flexible ribbon, cable, or other element that is sized and configured to extend along the track 162, and has at least one portion configured to bend and/or curl upon application of force to the electrical element 174. As illustrated in FIGS. 3 and 5, the electrical element 174 includes a first, flexible end portion 178 that is connected to the circuit board 46. The end portion 178 includes a contact region 182 that is sized and configured to engage a contact region 186 (as illustrated in FIG. 2) on the circuit board 46. The electrical element 174 also includes a second, flexible end portion 190 that is connected to the circuit board 170. The first and second end portions 178, 190 extend perpendicular to one another. With reference to FIG. 3, the electrical element 174 is coupled to the track 162, and is at least partially disposed between the track 162 and the carrier element 158. The electrical element 174 is held on the track 162, and guided, with retaining elements 194. The retaining elements 194 provide stress relief to inhibit fatigue failures in the electrical element 174.

With reference to FIGS. 2 and 3, the track 162 includes an end portion 198 having an aperture 202. The aperture 202 is sized and configured to fit over and receive the pivot element 74 on the partition element 50. When the end portion 198 is coupled to the pivot element 74, the track 162 is free to pivot about the pivot element 74 in a plane substantially parallel to the base surface 54 of the partition element 50. The end portion 198 fits through the aperture 70 on the partition element 50, with the aperture 70 being wide enough to allow the pivoting motion of the track 162 beneath the pan stage 78 and within an area bounded by the base surface 54 and the flange 62.

With reference to FIGS. 1 and 6-10, the slip ring assembly 126 is an off-axis assembly that maintains both the stator 130 and the rotor 146 at a fixed distance 198 (e.g., a fixed radial distance) from the pan axis 94, regardless of the rotational position of the pan stage 78.

As illustrated in FIGS. 6-10, because the stator 130 is fixed to the pan stage 78, as the pan stage 78 rotates about the pan axis 94, the track 162 is forced to pivot about the pivot element 74. As the track 162 pivots about the pivot element 74, the rotor 146 rotates relative to the stator 130, and the carrier element 158 slides along the track 162. As the carrier element 158 slides along the track 162, the stator 130 and the rotor 146 adjust both rotationally about the pivot element 74 as well as linearly relative to the pivot element 74. As the carrier element 158 slides along the track 162, the stator 130 and the rotor 146 adjust rotationally (e.g., 360 degrees or more) about the pan axis 94, which allows for continuous (e.g., non-stop) panning motion. Throughout movement of the components of the slip ring assembly 126, an electrical connection is maintained from the circuit board 46 to the electrical element 174, from the electrical element 174 to the circuit board 170, from the circuit board 170 to the wiring 154, from the wiring 154 to the rotor 146, from the rotor 146 to the stator 130, from the stator 130 to the electrical wiring 142, and from the electrical wiring 142 to one or more of the pan motor 98, the tilt motor 118, and the camera 110.

With reference to FIG. 1, the off-axis nature of the slip ring assembly 126 allows the camera 110 to be placed in close proximity to the pan stage 78, as opposed to being positioned directly above a slip ring stator. This allows an overall height 206 of the camera unit 10, as measured from a bottom of the base portion 18 to a top of the window portion 42, to be reduced by as much as at least 20% as compared with cameras that have the camera mounted directly above the slip ring stator, thereby creating a more compact camera unit 10. Reducing the overall height 206 allows the camera unit 10 to be less visually obtrusive, for example for a more covert operation and use. Reducing the overall height 206 also reduces the materials and cost involved in manufacturing the camera unit 10. Alternatively, in some constructions the height 206 is not reduced, and a larger camera 110 with better performance is instead used inside the camera unit 10.

Various features and advantages of the invention are set forth in the following claims.

What is claimed is:

1. A camera unit comprising:
   a housing;
   a pan stage disposed inside the housing and rotatable relative to the housing about a pan axis;
   a camera lens assembly coupled to the pan stage; and
   a slip ring assembly having a slip ring stator fixedly coupled to the pan stage at a location offset from the pan axis.

2. The camera unit of claim 1, wherein the slip ring assembly further includes a slip ring rotor, a carrier element, and a track, the slip ring rotor fixedly coupled to the carrier element and the carrier element slidably coupled to the track.

3. The camera unit of claim 2, wherein the slip ring rotor is disposed within the slip ring stator.

4. The camera unit of claim 2, wherein the track is pivotally coupled to the housing.

5. The camera unit of claim 2, wherein the carrier element is slidably disposed in a linear direction along the track.

6. The camera unit of claim 2, wherein the slip ring assembly further includes a flexible electrical element disposed on the track.

7. The camera unit of claim 6, wherein the camera unit further includes a first circuit board coupled to a first end of the electrical element, and a second circuit board coupled to a second end of the electrical element.

8. The camera unit of claim 1, further including a pan motor coupled to the pan stage to drive rotation of the pan stage about the pan axis and to drive movement of the slip ring stator.

9. The camera unit of claim 8, further including a stationary partition element disposed between the pan stage and the housing, the partition element including gear teeth that engage with the pan motor.

10. The camera unit of claim 1, wherein the slip ring stator is electrically coupled to the camera lens assembly.

11. The camera unit of claim 1, wherein the housing includes a pivot element, and wherein the slip ring stator is adjustable both rotationally about the pivot element as well as linearly relative to the pivot element.

12. The camera unit of claim 1, wherein the slip ring stator is adjustable rotationally about the pan axis.

13. The camera unit of claim 12, wherein the slip ring stator is adjustable 360 degrees about the pan axis.

14. The camera unit of claim 1, wherein the pan stage is generally circular, and wherein the slip ring stator remains at a fixed radius from the pan axis.

15. The camera unit of claim 1, wherein camera lens is rotatable about both the pan axis and a separate tilt axis.

16. A camera unit comprising:
    a housing having a window portion;
    a pan stage disposed inside the housing and rotatable relative to the housing about a pan axis, the pan axis extending through the window portion;
    a camera lens assembly coupled to the pan stage and disposed between the pan stage and the window portion; and
    a slip ring assembly coupled to the camera lens assembly, the slip ring assembly having a slip ring stator fixedly coupled to the pan stage at a location offset from the pan axis, a slip ring rotor coupled to the slip ring stator, a carrier element coupled to the slip ring rotor, and a track coupled to the carrier element and pivotally coupled to the housing, the carrier element slidably disposed along the track.

17. The camera unit of claim 16, wherein the slip ring stator is adjustable rotationally about the pan axis.

18. The camera unit of claim 16, wherein the camera unit further includes a pan motor coupled to the pan stage to drive rotation of the pan stage about the pan axis and to drive movement of the slip ring stator.

19. The camera unit of claim 16, wherein the slip ring stator is electrically coupled to the camera lens assembly.

20. The camera unit of claim 16, wherein the housing includes a pivot element, and wherein the slip ring stator is adjustable both rotationally about the pivot element as well as linearly relative to the pivot element.

* * * * *